United States Patent
Gantie et al.

(10) Patent No.: US 8,733,688 B2
(45) Date of Patent: May 27, 2014

(54) AIRCRAFT LEADING EDGE

(75) Inventors: Fabrice Gantie, Toulouse (FR); Alain Porte, Colomiers (FR)

(73) Assignee: Airbus Operations S.A.S., Toulouse (FR)

( * ) Notice: Subject to any disclaimer, the term of this patent is extended or adjusted under 35 U.S.C. 154(b) by 845 days.

(21) Appl. No.: 12/515,031

(22) PCT Filed: Nov. 13, 2007

(86) PCT No.: PCT/FR2007/052334
§ 371 (c)(1),
(2), (4) Date: May 15, 2009

(87) PCT Pub. No.: WO2008/059169
PCT Pub. Date: May 22, 2008

(65) Prior Publication Data
US 2010/0294882 A1    Nov. 25, 2010

(30) Foreign Application Priority Data

Nov. 16, 2006   (FR) ...................... 06 54929

(51) Int. Cl.
*B64C 1/40*        (2006.01)
*B64C 23/00*       (2006.01)

(52) U.S. Cl.
USPC ........................................................ 244/1 N

(58) Field of Classification Search
USPC ........... 244/1 N, 134 B, 134 C, 134 D, 134 R
See application file for complete search history.

(56) References Cited

U.S. PATENT DOCUMENTS

| 2,135,119 | A  | * | 11/1938 | Wood ......................... 244/134 A |
| 4,759,513 | A  |   | 7/1988  | Birbragher |
| 6,698,691 | B2 |   | 3/2004  | Porte |
| 7,923,668 | B2 | * | 4/2011  | Layland et al. ................ 219/535 |
| 2002/0139900 | A1 | * | 10/2002 | Porte et al. ................. 244/134 C |
| 2002/0179773 | A1 | * | 12/2002 | Breer et al. ................ 244/134 R |
| 2005/0006529 | A1 | * | 1/2005  | Moe et al. .................. 244/134 D |

FOREIGN PATENT DOCUMENTS

| EP | 0 067 506 | 12/1982 |
| EP | 1 232 944 | 8/2002 |
| EP | 1 495 963 | 1/2005 |
| EP | 1 715 160 | 10/2006 |
| FR | 2 887 519 | 12/2006 |

OTHER PUBLICATIONS

International Search Report dated Jun. 20, 2008, from corresponding PCT application.

* cited by examiner

*Primary Examiner* — Valentina Xavier
(74) *Attorney, Agent, or Firm* — Young & Thompson

(57) ABSTRACT

An aircraft leading edge, such as, for example, an air intake (22) of a nacelle (14) of a propulsion unit, includes a coating (26) for the acoustic treatment that includes—from the outside to the inside—an acoustically resistive porous layer that has a determined open surface ratio, at least one alveolar structure, and a reflective layer, whereby the coating (26) integrates a frost treatment system, characterized in that a frost treatment system includes at least one vibration emitter (36).

13 Claims, 3 Drawing Sheets

AIRCRAFT LEADING EDGE

BACKGROUND OF THE INVENTION

1. Field of the Invention

Figure 1:
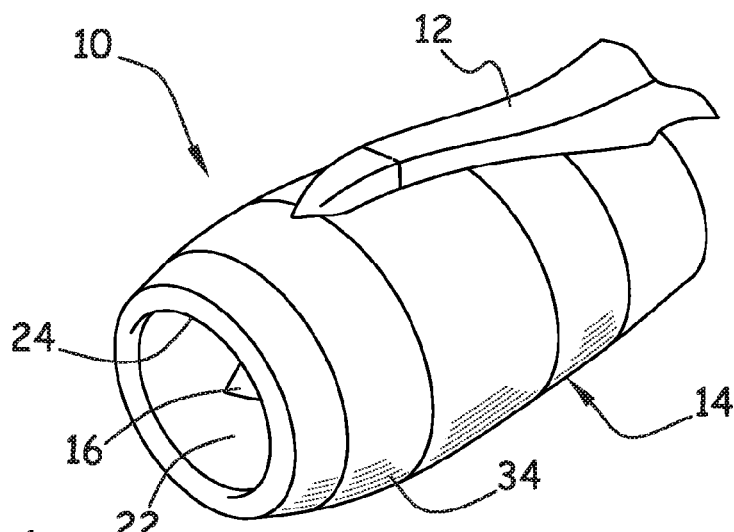

This invention relates to an aircraft leading edge and more particularly to an air intake of an aircraft nacelle that incorporates a coating for acoustic treatment as well as a system that makes it possible to prevent the formation and/or the accumulation of ice and/or frost.

2. Description of the Related Art

An aircraft propulsion unit comprises a nacelle in which a power plant that drives a fan mounted on its shaft is arranged essentially concentrically.

The nacelle comprises an inside wall that delimits a pipe with an air intake toward the front, a first portion of the entering air flow, called primary flow, passing through the power plant to participate in the combustion, the second portion of the air flow, called secondary flow, being driven by the fan and flowing into an annular pipe that is delimited by the inside wall of the nacelle and the outside wall of the power plant.

The noise emitted by the propulsion unit consists, on the one hand, of jet noise, produced on the outside of the pipes as a result of the mixing of various air flows and exhaust gases, and, on the other hand, of noise generated by the inside parts, called internal noise, produced by the fan, the compressors, the turbines and the combustion that propagates inside the pipes.

To limit the impact of noise pollution close to the airports, the international standards are increasingly restrictive as far as sound emissions are concerned.

Techniques have been developed to reduce the internal noise, in particular by using, at the walls of the pipes, coatings whose purpose is to absorb a portion of the sound energy, in particular by using the principle of Helmholtz resonators. In a known way, this acoustic coating, also called an acoustic panel, comprises—from the outside to the inside—an acoustically resistive porous layer, an alveolar structure, and a reflective layer.

Layer is defined as one or more layers that may or may not be of the same type.

The acoustically resistive porous layer is a porous structure that plays a dissipative role, partially transforming the acoustic energy of the sound wave that passes through it into heat. It comprises so-called open zones that are able to allow acoustic waves to pass and other so-called closed or full zones that do not allow the sound waves to pass but are designed to ensure the mechanical resistance of said layer. This acoustically resistive layer is characterized in particular by an open surface ratio that varies essentially based on the engine and the components that constitute said layer.

For the moment, because of various constraints, for example shaping or compatibility with other equipment, coatings are provided in particular at the inside wall of the nacelle on a limited zone that is distant from the air intake and the air discharge.

To increase the effectiveness of the acoustic treatment, one approach consists in increasing the surface areas that are covered by the acoustic coating. However, at the air intake or on the lip of the nacelle, the installation of an acoustic coating is not possible for the moment in particular because said coating is not compatible with the systems that make it possible to prevent the formation and/or the accumulation of ice and/or frost that are necessary in these zones.

These systems are divided into two large families, the first called defrosting systems that make it possible to limit the formation of ice and/or frost, the second called de-icing systems that limit the accumulation of ice and/or frost and act on both the ice and/or frost formed. Hereinafter, a frost treatment system is defined as a defrosting system or a de-icing system.

For the defrosting treatment, one approach consists in treating the aircraft on the ground by using a gas or a liquid that is deposited on the surfaces to be treated. Even if these treatments are effective, in particular at the time of take-off, they have a limited duration. It is necessary, however, that frost treatment systems be put on board the aircraft because the frost (or the ice) can form at the aerodynamic surface of the aircraft and more particularly at the leading edges of the wing, the nacelle, the stabilizer, etc., when the aircraft passes through certain meteorological conditions.

A first frost treatment system consists in using electric resistors that are made of a conductive material that is covered by an insulator to heat the surface to be treated by the Joule effect. This type of system is not satisfactory because it is relatively fragile and susceptible to being damaged by bird strikes, hail or accidents during maintenance. In the damaged zones, the frost treatment system can no longer function, making possible the formation and the accumulation of ice or frost. Furthermore, this type of frost treatment system has a relatively high electrical consumption so that it may be necessary for certain aircraft configurations to provide an additional power supply. Finally, it is not compatible with the coatings for the acoustic treatment because its presence on the surface generally changes the performance levels of the acoustic treatment.

Another frost treatment system consists in using hot air that is taken from the engine and fed back at the inside walls of the leading edges. This high-quality system is not very compatible with the acoustic treatment coating to the extent that the latter is relatively thick and consists of cavities that contain air and that act as an insulating material. Furthermore, the use of a hot-air system may prove problematic under certain flight conditions—in particular at the moment of deceleration before landing—that are generally the most likely times for frost to appear, to the extent that the production of hot air by the engine is reduced during these phases.

Finally, this type of frost treatment system also has the drawback of generating significant temperatures and pressure variations.

SUMMARY OF THE INVENTION

The object of this invention is to remedy the drawbacks of the prior art by proposing a leading edge and more particularly a nacelle air intake that incorporates a coating for acoustic treatment as well as a frost treatment system that are compatible and that make it possible to optimize the operation of each. According to another objective, this new arrangement is to make it possible to facilitate maintenance or to reduce maintenance operations so as to reduce down times on the ground.

For this purpose, the invention has as its object an aircraft leading edge, such as, for example, an air intake of a nacelle of a propulsion unit, comprising a coating for acoustic treatment that comprises—from the outside to the inside—an acoustically resistive porous layer that has a determined open surface ratio, at least one alveolar structure and a reflective layer, whereby said coating integrates a frost treatment system, characterized in that a frost treatment system comprises at least one vibration emitter.

This point-type frost treatment system does not extend over the entire surface to be treated although its influence on the operation of the acoustic treatment is small.

Preferably, the surface area of the vibration emitter that interferes with the acoustically resistance layer is relatively small so as to ensure the continuity of the homogeneous nature of the open surface ratio of the acoustically resistive layer.

Thus, the frost treatment system is compatible with the resistive layer to the extent that it does not alter its overall operation, whereby the shadow zone(s) corresponding to the presence of the frost treatment system(s) is/are small and able to produce only a slight variation of the open surface ratio at the acoustic treatment coating.

Preferably, the vibration emitter(s) is/are in contact with the surface to be treated, on which ice or frost can form.

Advantageously, the vibration emitter is arranged in a housing that empties out at the aerodynamic surface. This configuration makes it possible to facilitate the maintenance of the frost treatment system.

BRIEF DESCRIPTION OF THE DRAWING FIGURES

Figure 2:
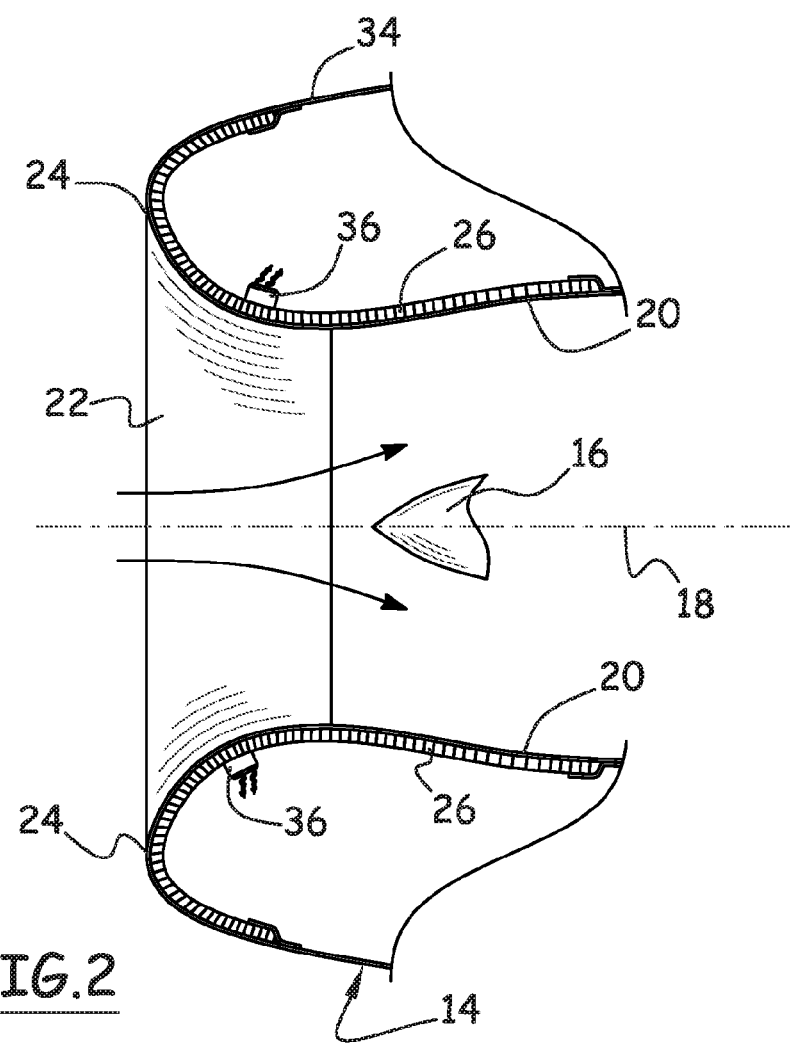
Figure 3:
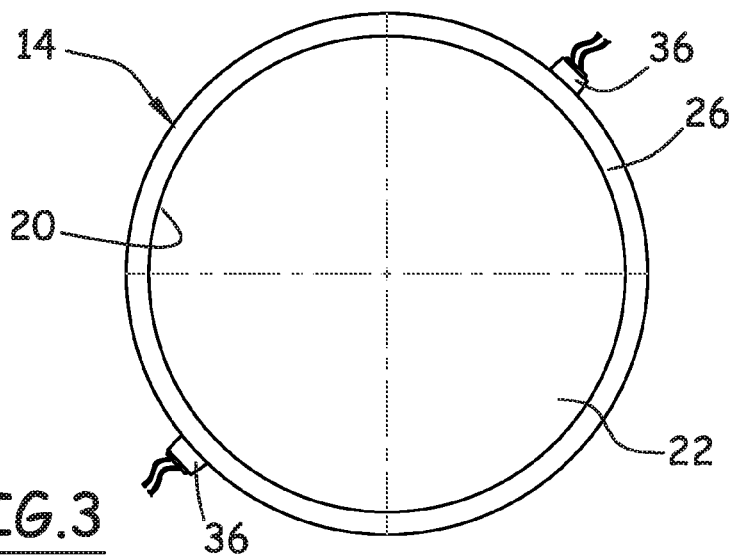
Figure 4:
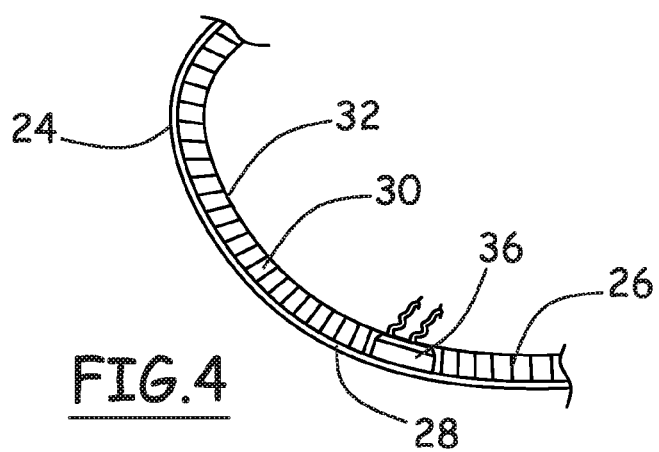
Figure 5:
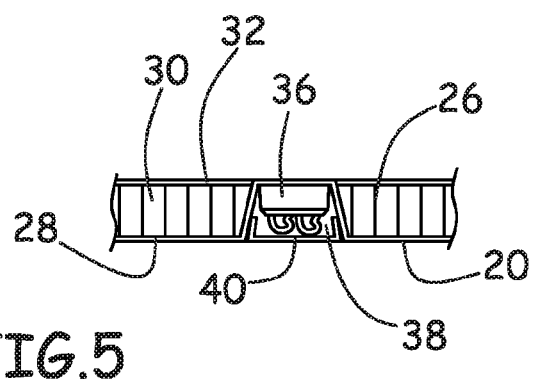
Figure 6:
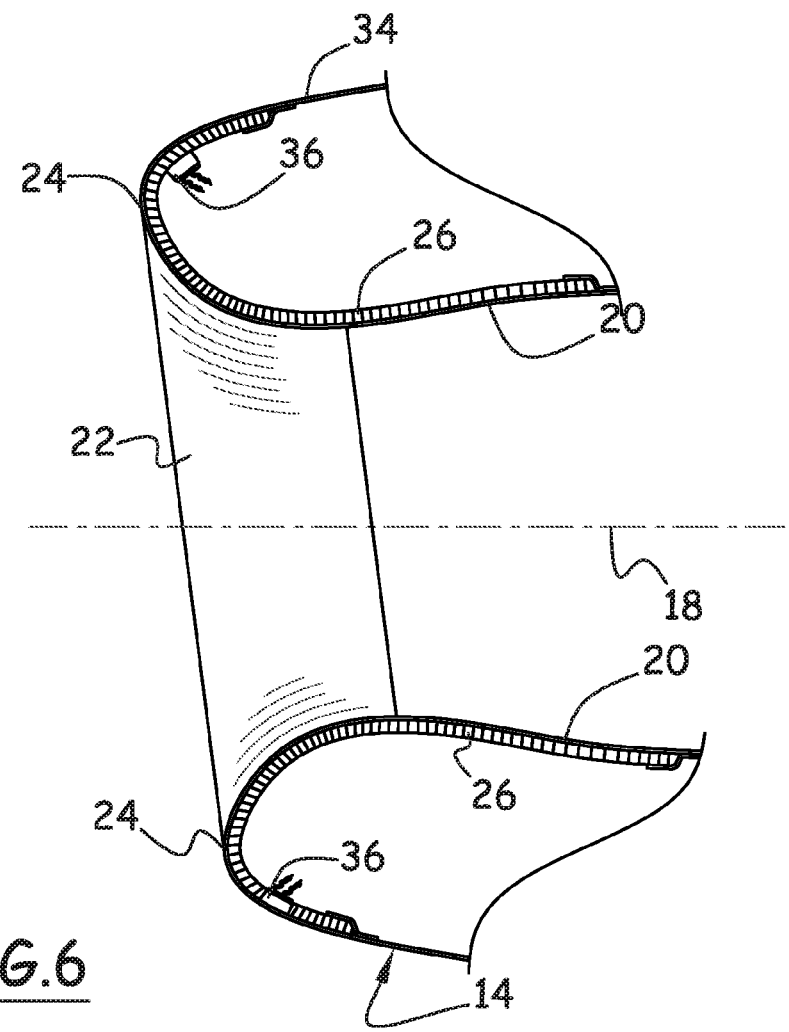
Figure 7:
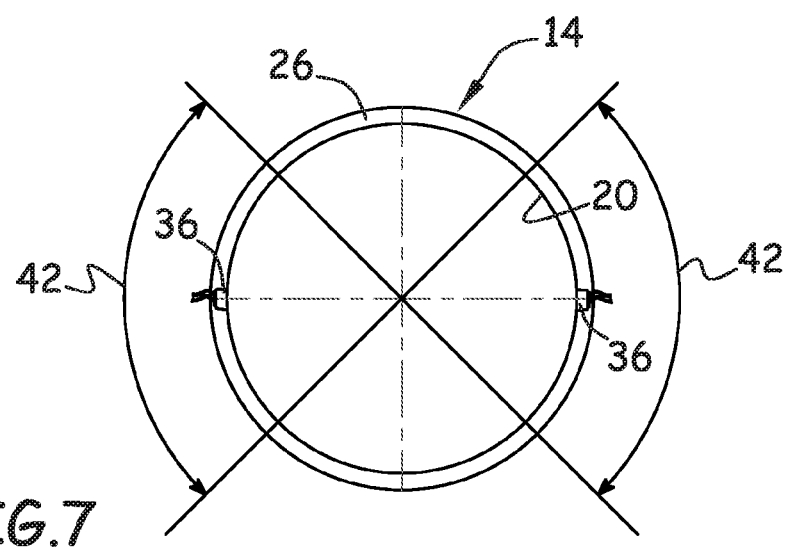

Other characteristics and advantages will emerge from the following description of the invention, a description that is provided only by way of example, with regard to the accompanying drawings in which:

FIG. 1 is a perspective view of a propulsion unit of an aircraft,

FIG. 2 is a longitudinal cutaway that illustrates an air intake of a nacelle according to the invention, FIG. 3 is a cross-section that illustrates an air intake of a nacelle according to the invention, FIG. 4 is a cutaway that illustrates in details a variant of the invention, FIG. 5 is a cutaway that illustrates in details another variant of the invention, FIG. 6 is a longitudinal cutaway that illustrates the installation of the vibration emitters at an air intake, and FIG. 7 is a cross-section that illustrates the installation of the vibration emitters at the air intake.

DETAILED DESCRIPTION OF THE INVENTION

This invention is now described applied to an air intake of a propulsion unit of an aircraft. However, it can apply to various leading edges of an aircraft where an acoustic treatment and a frost treatment are performed, for example the leading edges of the wings.

Hereinafter, frost is defined both as frost and ice, of all kinds, all structures and all thicknesses.

In FIG. 1, a propulsion unit 10 of an aircraft that is connected under the wing by means of a mast 12 is shown. However, this propulsion unit could be connected to other zones of the aircraft.

This propulsion unit comprises a nacelle 14 in which a power plant that drives a fan that is mounted on its shaft 16 is arranged essentially concentrically. The longitudinal axis of the nacelle is referenced 18.

The nacelle 14 comprises an inside wall 20 that delimits a pipe with an air intake 22 toward the front, a first portion of the entering air flow, called primary flow, passing through the power plant to participate in the combustion, the second portion of the air flow, called secondary flow, being driven by the fan and flowing into an annular pipe that is delimited by the inside wall 20 of the nacelle and the outside wall of the power plant.

The top part 24 of the air intake 22 describes an essentially circular shape that extends in a plane that can be essentially perpendicular to the longitudinal axis 18, as illustrated in FIG. 2, or not perpendicular, with the top part located just before 12 o'clock, as illustrated in FIG. 6. However, other air intake shapes can be considered.

Hereinafter, aerodynamic surface is defined as the shell of the aircraft that is in contact with the aerodynamic flow.

To limit the impact of pollution, a coating 26 whose purpose is to absorb a portion of the sound energy, in particular by using the principle of Helmholtz resonators, is provided in particular at the aerodynamic surfaces. In a known way, this acoustic coating, also called an acoustic panel, comprises—from the outside to the inside—an acoustically resistive layer 28, at least one alveolar structure 30, and a reflective layer 32, as illustrated in FIGS. 4 and 5.

Layer is defined as one or more layers that may or may not be of the same type.

The acoustically resistive layer 28 is a porous structure that plays a dissipative role, partially transforming the acoustic energy of the sound wave that passes through it into heat. This layer 28 can comprise so-called open zones that are able to allow acoustic waves to pass and other so-called closed or filled zones that do not allow acoustic waves to pass but are intended to ensure the mechanical strength of said layer. This acoustically resistive layer is characterized in particular by an open surface ratio that varies essentially based on the engine and components that constitute said layer.

These various layers are not described in more detail because they are known to one skilled in the art.

According to the invention, to also reduce the noise pollution, the air intake 22 comprises an acoustic coating 26 on at least one portion of the aerodynamic surface.

According to one embodiment, this acoustic coating 26 extends from the inside wall 20 of the nacelle up to the top part 24 of the air intake over the entire periphery of the air intake. Preferably, as illustrated in FIGS. 2 and 6, the acoustic coating 26 extends beyond the top part 24 of the air intake and covers a portion of the outside surface 34 of the nacelle.

The installation of the acoustic coating or its structure are not presented in more detail because some of them are known to one skilled in the art and others are the subject of patent applications in the name of the applicant of this application.

To limit the formation of frost or to prevent its accumulation, at least one frost treatment system is provided at the air intake 22.

Hereinafter, frost treatment system is defined as a defrosting system or a de-icing system.

To be able to make the acoustic treatment and the frost treatment compatible and so that the operation of one does not impede the operation of the other, the frost treatment system is of the point type.

By being of the point type, the frost treatment system interferes on only a small surface area with the acoustically resistive layer 28 of the acoustic treatment.

Point type is defined as a local action whose propagation speed and/or the propagation at the surface to be treated are significant, contrary to the effect of a treatment system that uses hot air or electric resistors whose action is superficial or whose propagation or propagation speed is reduced.

The frost treatment system of the point type comprises at least one vibration emitter 36.

According to another characteristic of the invention, the surface area of the frost treatment system(s) interfering with the acoustically resistive layer is small, so that the acoustic coating surface area that is impacted by the frost treatment system of the point type is less than 10%. The surface area of the air intake extends inside the pipe of the nacelle over a length on the order of 1 to 2 m.

By way of example, an air intake that has a diameter of 3 m comprises six vibration emitters.

According to the variants, the vibration emitter 36 can have various modes of operation. Thus, according to a first mode of operation, the vibration emitter 36 can emit waves whose frequency varies in such a way as to sweep a given frequency range so as to resonate with all sizes and/or all structures of ice or frost. This variant has the advantage of breaking the ice into elements of small sizes that do not run the risk of the power plant being damaged when they are ingested by the latter. Nevertheless, it is advisable not to maintain a frequency that corresponds to the resonance frequency of a constituent element of the aircraft, such as, for example, the acoustic coating, for a significant period, so as not to run the risk of said element being damaged.

According to another mode of operation, the vibration emitter can transmit one or more waves of significant amplitudes so as to cause a shock that can break the ice. To be able to use this principle of operation, the layer of ice or frost is to be relatively thick. Consequently, the fragments of ice or frost can be of relatively large sizes. Also, this mode of operation will be used for the emitters that are arranged on the outside surface 34 of the nacelle so that the fragments that are produced are not ingested by the power plant.

According to another characteristic of the invention, the emitter 36 is in contact with the surface to be treated of the air intake, the one in contact with the aerodynamic air flow on which the frost is likely to form, as illustrated in FIGS. 4 and 5.

This configuration makes it possible to prevent the attenuation of waves by passing through the acoustic coating. Consequently, it is then possible to reduce the amplitude of vibrations or to reduce the number of vibration emitters 36 at the air intake. In addition, this configuration makes it possible to limit the risks of the acoustic coating being damaged.

According to a first configuration that is illustrated in FIG. 4, the emitter is in contact with the inside face of the wall that forms the aerodynamic surface of the air intake to be treated.

According to another characteristic of the invention, the vibration emitter 36 is arranged in a housing 38 (or cavity) that empties out at the aerodynamic surface, as illustrated in FIG. 5. This configuration makes it possible to facilitate the maintenance and to reduce the down times of the aircraft, whereby the vibration emitter 36 is accessible from the outside. Advantageously, the housing 38 comprises means for sealing, for example a flap 40, to ensure the continuity of the aerodynamic surface and to reduce the disruption of the air flow into the environment of said aerodynamic surface.

According to an embodiment that is illustrated in FIG. 5, the aerodynamic surface, in particular the acoustically resistive porous layer 28, comprises a hollow shape that can form a housing 38. The emitter 36 is then arranged in the housing 38 against the outside face of the aerodynamic surface. A flap 40 that makes it possible to close the housing 38 again allows access to the emitter 36.

According to another characteristic of the invention, the point-type frost treatment system can be combined with other frost treatment systems, in particular those that make it possible to prevent the formation of frost, such as electric resistors.

Thus, the vibration emitters are arranged at the outside surface 34 of the nacelle, as illustrated in FIG. 6, and/or inside the nacelle at angular sectors 42 that extend from approximately 2 o'clock to approximately 4 o'clock and from approximately 8 o'clock to approximately 10 o'clock.

Thus, the vibration emitters that have a relatively low energy consumption are arranged at the outside surface because the risks that an ice fragment from this zone will be ingested by the power plant are limited. Likewise, the formation of ice or frost is limited to the interior of the nacelle at angular sectors that are referenced 42, so that a vibration emitter can be used by frequency sweeping.

Because the frost or the ice has a tendency to form more significantly in the zones that are provided inside the nacelle between the angular sectors 42 and to limit the risks of the power plant's ingestion of large fragments, an electric-type frost treatment system with Joule effect, whose operation is more reliable and that prevents the formation of frost or ice, even if this type of frost treatment system has a higher energy consumption, will be used in these zones.

This combination of various frost treatment systems makes it possible to optimize the treatment by limiting the energy consumption, while having a reliable and effective operation.

Of course, the invention obviously is not limited to the embodiment that is shown and described above, but on the contrary covers all of the variants, in particular regarding the shapes, the sizes, and the components of the vibration emitters.

The invention claimed is:

1. An aircraft leading edge, comprising:
    an acoustic coating (26) comprising an outside surface in contact with an aerodynamic flow and an inside surface, so that said acoustic coating (26) comprises from the outside surface to the inside surface an acoustically resistive porous layer (28) that has a determined open surface ratio, the outside surface defining an aerodynamic surface;
    at least one alveolar structure (30); and
    a reflective layer (32), wherein said acoustic coating (26) integrates a frost treatment system, and said frost treatment system comprises at least one vibration emitter (36) arranged in a housing (38) that empties out at the outside surface, the housing including a flap (40) arranged to allow access to the vibration emitter (36) and to close the housing (38), the flap (40) ensuring continuity of the aerodynamic surface, and
    a surface area of the housing provided for the frost treatment system interfering with the aerodynamic surface is less than 10% of a surface area of the acoustic coating.

2. The aircraft leading edge according to claim 1, wherein the at least one vibration emitter (36) is in contact with the flap.

3. The aircraft leading edge according to claim 1, wherein the acoustically resistive porous layer (28) comprises a hollow shape configured to form the housing (38), the at least one vibration emitter (36) being arranged in said housing (38) against the flap.

4. The aircraft leading edge according to claim 1, wherein the housing (38) comprises means for sealing the leading edge.

5. An air intake (22) of a nacelle (14) of an aircraft propulsion unit (10), comprising:
    an acoustic coating (26) comprising an outside surface in contact with an aerodynamic flow and an inside surface, said acoustic coating (26) comprising from the outside surface to the inside surface and acoustically resistive porous layer (28) that has a determined open surface ratio, the outside surface defining an aerodynamic surface;
    an alveolar structure (30); and
    a reflective layer (32), wherein said acoustic coating (26) integrates at least one frost treatment system which comprises at least one vibration emitter (36) arranged in a housing (38) that empties out at the outside surface, the housing including a flap (40) arranged to allow access to the vibration emitter (36) and to close the housing (38), the flap (40) ensuring continuity of the aerodynamic surface, and a surface area of the housing provided for the frost treatment system interfering with the aerodynamic surface is less than 10% of a surface area of the acoustic coating.

6. The air intake of a nacelle according to claim 5, wherein the at least one vibration emitter (36) is in contact with the flap.

7. The air intake of a nacelle according to claim 5, wherein the acoustically resistive porous layer (28) comprises a hollow shape that can form the housing (38), the vibration emitter being arranged in said housing (38) against the flap.

8. The air intake of a nacelle according to claim 5, wherein the housing (38) comprises means for sealing.

9. The air intake of a nacelle according to claim 5, wherein the at least one frost treatment systems is arranged at at least one of the outside surface (34) of the nacelle or inside the nacelle at a first angular sector between 60° and 120° and a second angular between 240° and 300°.

10. An aircraft leading edge, comprising:
an acoustic coating (26) comprising an outside surface in contact with an aerodynamic flow and an inside surface, so that said acoustic coating (26) comprises from the outside surface to the inside surface an acoustically resistive porous layer (28) that has a determined open surface ratio, the outside surface defining an aerodynamic surface;
at least one alveolar structure (30); and
a reflective layer (32), wherein said acoustic coating (26) integrates a frost treatment system, and said frost treatment system comprises at least one vibration emitter (36) arranged in a housing (38) that empties out at the outside surface, the housing including a flap (40) arranged to allow access to the vibration emitter (36) and to close the housing (38), the flap (40) ensuring continuity of the aerodynamic surface, and the acoustically resistive porous layer (28) comprises a hollow shape configured to form a housing (38), the at least one vibration emitter (36) being arranged in said housing (38) against the aerodynamic surface.

11. The aircraft leading edge according to claim 1, wherein the acoustic coating is configured to absorb a portion of sound energy on a principle of Helmholz resonators, the at least one vibration emitter has a first mode of operation whose frequency varies to sweep a frequency range so as to resonate with all sizes and structures of ice and frost, and the at least one vibration emitter has a second mode of operation to maintain a frequency the corresponds to a resonance frequency of the acoustic coating.

12. The air intake according to claim 5, wherein the acoustic coating is configured to absorb a portion of sound energy on a principle of Helmholz resonators, the at least one vibration emitter has a first mode of operation whose frequency varies to sweep a frequency range so as to resonate with all sizes and structures of ice and frost, and the at least one vibration emitter has a second mode of operation to maintain a frequency the corresponds to a resonance frequency of the acoustic coating.

13. The aircraft leading edge according to claim 10, wherein the acoustic coating is configured to absorb a portion of sound energy on a principle of Helmholz resonators, the at least one vibration emitter has a first mode of operation whose frequency varies to sweep a frequency range so as to resonate with all sizes and structures of ice and frost, and the at least one vibration emitter has a second mode of operation to maintain a frequency the corresponds to a resonance frequency of the acoustic coating.

* * * * *